US010047904B1

(12) United States Patent
Ewen, III et al.

(10) Patent No.: US 10,047,904 B1
(45) Date of Patent: *Aug. 14, 2018

(54) APPARATUS, SYSTEM AND METHOD FOR SECURING, ATTACHING AND/OR DETACHING A DEVICE TO A FIXTURE (71) Applicant: Sennco Solutions, Inc., Plainfield, IL (US)

(72) Inventors: John E. Ewen, III, Aurora, IL (US); Andy G. Reynolds, Aurora, IL (US); James Groth, Poplar Grove, IL (US); Bjarne Frederiksen, Lombard, IL (US)

(73) Assignee: Sennco Solutions, Inc., Plainfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,357

(22) Filed: May 26, 2017

Related U.S. Application Data (60) Continuation of application No. 15/051,802, filed on Feb. 24, 2016, now Pat. No. 9,664,336, which is a
(Continued)

(51) Int. Cl.
F16M 13/00 (2006.01)
F16M 13/02 (2006.01)
(Continued)

(52) U.S. Cl.
CPC ............ F16M 13/02 (2013.01); A47F 7/024 (2013.01); F16M 11/041 (2013.01);
(Continued)

(58) Field of Classification Search
USPC ...... 248/551, 553, 176.1, 178.1, 187.1, 685; 340/568.1, 568.2, 568.8
See application file for complete search history.

(56) References Cited

U.S. PATENT DOCUMENTS 4,335,931 A  6/1982 Kinnear
4,673,023 A  6/1987 Winston
(Continued)

FOREIGN PATENT DOCUMENTS

GB  2128790 A  5/1984
WO  WO2012069816  5/2012

OTHER PUBLICATIONS

"Se-Kure Controls: 4-Port and One-on-One Alarms", Se-Kure Controls, Inc. Website, http://www.se-kure.com/page7.htm.
(Continued)

Primary Examiner — Bradley Duckworth
(74) Attorney, Agent, or Firm — Lempia Summerfield Katz LLC (57) ABSTRACT An apparatus, a system and a method secures, attaches and/or detaches a device to a fixture. A post with an interior secures a retractable reel. The retractable reel has a cable that attaches, connects and/or secures the device to the fixture. The cable extends from the retractable reel and/or extends through the post. A head unit attaches to the device and has a fastening mechanism for connecting and/or for disconnecting the cable to the device. The post has a recession for receiving a head unit and/or for aligning the head unit and/or the device. A fastener and/or an adhesive connects, secures and/or attaches the device to the head unit. A key disconnects the cable from the head unit.

27 Claims, 3 Drawing Sheets

Related U.S. Application Data division of application No. 13/600,047, filed on Aug. 30, 2012, now Pat. No. 9,303,809.

(51) Int. Cl.
  *F16M 11/04* (2006.01)
  *F16M 11/22* (2006.01)
  *A47F 7/024* (2006.01)

(52) U.S. Cl.
  CPC ............ *F16M 11/22* (2013.01); *F16M 13/00* (2013.01); *Y10T 29/49826* (2015.01)

(56) References Cited

U.S. PATENT DOCUMENTS

| | | | |
|---|---|---|---|
| 4,895,140 A | 1/1990 | Bellak | |
| 4,896,140 A | 1/1990 | Biever et al. | |
| 4,973,023 A | 11/1990 | O'Neill | |
| 5,066,942 A | 11/1991 | Matsuo | |
| 5,072,213 A | 12/1991 | Close | |
| 5,124,685 A | 6/1992 | Rankin | |
| 5,172,098 A | 12/1992 | Leyden et al. | |
| 5,246,183 A | 9/1993 | Leyden | |
| 5,552,771 A | 9/1996 | Leyden et al. | |
| 5,565,848 A | 10/1996 | Leyden et al. | |
| 5,676,258 A | 10/1997 | Leyden et al. | |
| 5,861,807 A | 1/1999 | Leyden et al. | |
| 6,019,304 A | 2/2000 | Skowronski et al. | |
| 6,027,277 A | 2/2000 | Leyden et al. | |
| 6,039,498 A | 3/2000 | Leyden et al. | |
| 6,087,939 A | 7/2000 | Leyden et al. | |
| 6,337,633 B1 | 1/2002 | Foseide | |
| RE37,590 E | 3/2002 | Leyden et al. | |
| 6,386,906 B1 | 5/2002 | Burke | |
| 6,459,374 B1 | 10/2002 | Rand et al. | |
| 6,476,717 B1 | 11/2002 | Gross et al. | |
| 6,495,756 B1 | 12/2002 | Burke et al. | |
| 6,502,727 B1 | 1/2003 | Decoteau | |
| 6,756,900 B2 | 6/2004 | Leyden et al. | |
| 6,761,579 B2 | 7/2004 | Fort et al. | |
| 6,799,994 B2 | 10/2004 | Burke | |
| 6,946,961 B2 | 9/2005 | Frederiksen et al. | |
| 7,053,774 B2 | 5/2006 | Sedon et al. | |
| 7,154,039 B1 | 12/2006 | Marszalek et al. | |
| 7,202,417 B2 | 4/2007 | Marszalek et al. | |
| 7,202,786 B2 | 4/2007 | Marszalek et al. | |
| 7,223,917 B1 | 5/2007 | Marszalek et al. | |
| 7,287,652 B2 | 10/2007 | Scholen et al. | |
| 7,327,276 B1 | 2/2008 | Deconinck et al. | |
| 7,385,522 B2 | 6/2008 | Belden, Jr. et al. | |
| 7,387,003 B2 | 6/2008 | Marszalek et al. | |
| 7,487,652 B2 | 2/2009 | Marszalek et al. | |
| 7,504,944 B2 | 3/2009 | Marszalek et al. | |
| 7,592,548 B2 | 9/2009 | Marszalek et al. | |
| 7,593,142 B2 | 9/2009 | Marszalek et al. | |
| 7,614,601 B2 | 11/2009 | Marsilio et al. | |
| 7,629,895 B2 | 12/2009 | Belden, Jr. et al. | |
| 7,667,601 B2 | 2/2010 | Rabinowitz et al. | |
| 7,710,266 B2 | 5/2010 | Belden, Jr. et al. | |
| 7,714,722 B2 | 5/2010 | Marszalek et al. | |
| D616,778 S | 6/2010 | Marszalek et al. | |
| 7,971,845 B2 | 7/2011 | Galant | |
| 8,674,833 B2 | 3/2014 | Johnston et al. | |
| 8,749,194 B1 | 6/2014 | Kelsch et al. | |
| 9,303,809 B2 * | 4/2016 | Reynolds ............. | F16M 11/041 |
| 9,664,336 B2 * | 5/2017 | Ewen, III ............... | F16M 13/02 |
| 2005/0073413 A1 | 4/2005 | Sedon et al. | |
| 2006/0086160 A1 | 4/2006 | Marszalek et al. | |
| 2006/0248781 A1 | 11/2006 | Horvath | |
| 2007/0113973 A1 | 5/2007 | Marszalek et al. | |
| 2007/0125569 A1 | 6/2007 | Marszalek et al. | |
| 2007/0145209 A1 | 6/2007 | Marsilio et al. | |
| 2007/0169956 A1 | 7/2007 | Marszalek et al. | |
| 2007/0194918 A1 | 8/2007 | Rabinowitz et al. | |
| 2008/0047178 A1 | 2/2008 | Marszalek | |
| 2008/0156959 A1 | 7/2008 | Fawcett et al. | |
| 2008/0169923 A1 | 7/2008 | Belden et al. | |
| 2008/0204239 A1 | 8/2008 | Marszalek et al. | |
| 2009/0058643 A1 | 3/2009 | Groth | |
| 2009/0173868 A1 | 7/2009 | Fawcett et al. | |
| 2009/0266963 A1 | 10/2009 | Marszalek et al. | |
| 2010/0176945 A1 | 7/2010 | Fawcett et al. | |
| 2010/0301998 A1 | 12/2010 | Marszalek et al. | |
| 2011/0047844 A1 | 3/2011 | Fawcett et al. | |
| 2011/0068919 A1 | 3/2011 | Rapp et al. | |
| 2011/0068920 A1 | 3/2011 | Yeager et al. | |
| 2011/0084689 A1 | 4/2011 | Groth et al. | |
| 2011/0084838 A1 | 4/2011 | Fawcett | |
| 2011/0303816 A1 | 12/2011 | Horvath et al. | |
| 2011/0309934 A1 | 12/2011 | Henson et al. | |
| 2012/0019383 A1 | 1/2012 | Fawcett et al. | |
| 2012/0188082 A1 | 7/2012 | Berglund et al. | |
| 2012/0205326 A1 | 8/2012 | Richter et al. | |
| 2012/0241108 A1 | 9/2012 | Marszalek et al. | |
| 2014/0106608 A1 | 4/2014 | Howarth et al. | |

OTHER PUBLICATIONS

"Se-Kure Controls: Detailed Descriptions of Items Too New for Catalog," Se-Kure Controls, Inc. Website, http://www.se-kure.com/new_listings.htm.
"The Next Generation in Display Security VANTAGE II", Se-Kure Controls, Inc. Flyer.
"The Next Generation in Display Security VANTAGE", Se-Kure Controls, Inc. Flyer.
Freedom LP™ New Product Development, MTI Copyright 2009.
Freedom LP™ Product Manual, pp. 1-19, Aug. 4, 2009.
Freedom Universal 2.0 Product Manual, pp. 1-21, Jul. 2009.
Freedom Universal™ Product Manual, pp. 1-21, Sep. 17, 2009.
Freedom Universal™ Product Manual, pp. 1-22, Jun. 9, 2006.
InVue Security Products USB Sensors, Promotional Flyer.
MTI, Freedom™ C, CEhh Merchandising System Version 2.0, Universal Power & Video Switching, pp. 1-30, Nov. 2005.
MTI. Freedom™ C, CEhh Merchandising System Version 2.0, Universal Power & Video Switching, pp. 1-30, Nov. 2005.
T-Mobile Freedom LP Product Manual, pp. 1-17, Sep. 25, 2006.
Definition of "Spring", A Dictionary of Mechanical Engineering p. 344, First Edition published in 2013; 4 pages.
Petition for Inter Partes Review of claims 1-13 of U.S. Pat. No. 9,303,809, Case IPR 2017-02200; U.S. Pat. No. 9,303,809; 82 pages.
Freedom ONE™, Product Manual, pp. 1-32, Jun. 2011.
Petition for Inter Partes Review, AIA Review No. IPR2018-01218 for U.S. Pat. No. 9,664,336, pp. 1-73, Jun. 6, 2018.

* cited by examiner

APPARATUS, SYSTEM AND METHOD FOR SECURING, ATTACHING AND/OR DETACHING A DEVICE TO A FIXTURE

CROSS REFERENCE TO RELATED APPLICATIONS

This application is a continuation application of and claims the benefit of U.S. application Ser. No. 15/051,802, filed Feb. 24, 2016, which is a divisional application of and claims the benefit of U.S. application Ser. No. 13/600,047, filed Aug. 30, 2012. The entire contents of these documents are hereby incorporated herein by reference.

BACKGROUND OF THE INVENTION

The present invention generally relates to an apparatus, a system and a method for securing, for attaching and/or for detaching a device to a fixture. More specifically, the present invention relates to an apparatus, a system and a method for securing, for attaching and/or for detaching a portable electronic device, such as, for example, a camera, a camcorder, a digital camera, a digital music player, a video game, a digital video player, a digital video recorder, a personal data assistant (hereinafter "a PDA"), a laptop or tablet computer, an E-book, an E-reader, a cellular telephone and/or the like. The apparatus, the system and the method for securing, for attaching and/or for detaching the device may attach the device to the fixture to deter and/or prevent theft and/or destruction of the device. The device may be a portable electronic device which may be, for example, displayed for sale by a retailer, a wholesaler and/or the like.

It is generally known, for example, that vendors, retailers and/or wholesalers may display a device to a customer at, for example, a retail store and/or a sales facility for examination and/or inspection by the customer. The device may be a portable electronic device, such as, for example, a camera, a digital camera, a compact disc player, an MP3 player, a PDA, a laptop or tablet computer, an E-book, an E-reader, a cellular telephone and/or the like. The device is traditionally displayed in conjunction with a fixture, such as, for example, a wall, a floor, a pillar, a support beam, a stair case or a fixture, such as, for example, a cabinet, a table, a shelf and/or the like.

Generally, the device is fixed to a surface of the fixture, and/or a cable attaches the device to the fixture. The cable is often not adjustable or has a limited length. In addition, the cable is often not detachable. As a result, the customer and/or the user is unable to examine the device while being independent of the cable and/or fixture. For example, pulling of the cable often prevents the customer and/or the user from examining the various characteristics of the device, such as, for example, the weight, the feel, and the portability of the device. Further, the attachment of the cable prevents the customer and/or the user from examining the size, weight and/or other dimensions of the device with respect to a laptop bag, a book bag, and/or a pant pocket, for example.

A need, therefore, exists for an apparatus, a system and a method for securing, for attaching and/or for detaching a device to a fixture. Additionally, a need exists for an apparatus, a system and a method for securing, for attaching and/or for detaching a device to a fixture which may allow a device to be detached from the fixture to allow a customer and/or a user to manipulate and/or examine the device. Moreover, a need exists for an apparatus, a system and a method for securing, for attaching and/or for detaching a device to a fixture which may allow a device to be re-attached to a fixture after detachment from the fixture. Further, a need exists for an apparatus, a system and a method for securing, for attaching and/or for detaching a device to a fixture which may provide electrical security to the device while the device is detached from a fixture. Even further, a need exists for an apparatus, a system and a method for securing, for attaching and/or for detaching a device to a fixture which may utilize a retractable reel for retracting a cable. Moreover, a need exists for an apparatus, a system and a method for securing, for attaching and/or for detaching a device to a fixture which may trigger an alarm for a separation of the device from the cable and/or the separation of the device from the apparatus.

SUMMARY OF THE INVENTION

The present invention generally relates to an apparatus, a system and a method for securing, for attaching and/or for detaching a device to a fixture. Examples of devices may include, for example, a camera, a digital camera, a compact disc player, an MP3 player, a PDA, a laptop or tablet computer, an E-book, an E-reader, a cellular telephone and/or the like. Further, the apparatus, the system and the method for securing, for attaching and/or for detaching the device to a fixture may have a base, a cable and a connector for attaching to the device. Moreover, the apparatus, the system and the method for securing, for attaching and/or for detaching the device to a fixture may allow the device to be detached from the fixture.

To this end, in an embodiment of the present invention, an apparatus for securing a device is provided. The apparatus has a post, a connector, a cable, a head unit, a spring and a slot. The cable has a length defined between a first end and a second end. The first end of the cable is attached to the connector. The head unit removably attaches to the post and has an interior compartment with an opening to receive the connector. The interior compartment also has a spring to removably hold the connector. Moreover, the head unit has a slot to provide access to the spring from outside the head unit.

In an embodiment, the apparatus has a key sized for inserting into the slot wherein the key releases the spring from the connector.

In an embodiment, the apparatus has a reel connected to the second end of the cable wherein the reel is attached to the post.

In an embodiment, the apparatus has a groove in the connector wherein the spring is secured in the groove.

In an embodiment, the apparatus has a tip on the connector wherein the tip has a taper.

In an embodiment, the apparatus has a plunger in the head unit wherein the plunger extends through the head unit.

In an embodiment, the apparatus has an adhesive on the head unit.

In an embodiment, the apparatus has a wall extending from the slot toward the spring.

In another embodiment of the present invention, a system for securing a device is provided. The system has a post a cable, a connector and a head unit. The post has an interior and a recession. The cable extends from the interior of the post and through a hole in the recession. The cable is attached to a connector and extends through an opening in the head unit. The head unit is movable from the post.

In an embodiment, the head unit is inserted into the recession.

In an embodiment, the system has a spring in the head unit.

In an embodiment, the system has a plunger extending from the head unit.

In an embodiment, the system has the head unit with an adhesive.

In an embodiment, the system has a key that detaches the head unit from the connector.

In another embodiment of the present invention, a method to attach and to detach a device to a fixture is provided. The method has the step of providing a post having a cable and a connector wherein the post mounts on the fixture. Further, the method connects the head unit to the post with the connector allowing the head unit to attach to a device. Moreover, the method detaches the connector from the head unit to release the device from the post.

In an embodiment, the method has the step of inserting the head unit into the post to connect the head unit to the connector.

In an embodiment, the method has the step of aligning the head unit with respect to the post.

In an embodiment, the method has the step of aligning the connector with respect to the head unit.

In an embodiment, the method has the step of providing a spring to removably secure the connector to the connector.

In an embodiment, the method has the step of providing a key to detach the connector from the head unit.

It is, therefore, an advantage of the present invention to provide an apparatus, a system and a method for securing, for attaching and/or for detaching a device to a fixture.

Another advantage of the present invention is to provide an apparatus, a system and a method for securing, for attaching and/or for detaching a device to a fixture which may be utilized to prevent theft of and/or destruction of the device.

And, another advantage of the present invention is to provide an apparatus, a system and a method for securing, for attaching and/or for detaching a device to a fixture which may allow the device to be moved with respect to the fixture which may allow the device to be manipulated and/or to be examined by a user.

Yet another advantage of the present invention is to provide an apparatus, a system and a method for securing, for attaching and/or for detaching a device to a fixture which may allow a user to detach the device from a fixture to examine characteristics of the device and/or to manipulate the device.

A further advantage of the present invention is to provide an apparatus, a system and a method for securing, for attaching and/or for detaching a device to a fixture which may allow a device to be re-attached to a fixture after detachment from the fixture.

Moreover, an advantage of the present invention is to provide an apparatus, a system and a method for securing, for attaching and/or for detaching a device to a fixture which may allow a user to remove the device from a fixture to examine characteristics of the device and/or to manipulate the device without detaching the device from the fixture.

Another advantage of the present invention is to provide an apparatus, a system and a method for securing, for attaching and/or for detaching a device to a fixture which may provide a post for displaying, for connecting and/or for attaching the device to a fixture.

And, another advantage of the present invention is to provide an apparatus, a system and a method for securing, for attaching and/or for detaching a device to a fixture which may provide a head unit attachable to the device and/or a cable of a retractable reel for securing, for attaching and/or for connecting the device to a fixture.

Yet another advantage of the present invention is to provide an apparatus, a system and a method for securing, for attaching and/or for detaching a device to a fixture which may provide a fastening mechanism within a head unit to allow a device to be attached and/or detached from the fixture.

A still further advantage of the present invention is to provide an apparatus, a system and a method for securing, for attaching and/or for detaching a device to a fixture which may provide a slot within a head unit for providing access to the fastening mechanism from outside the head unit.

Another advantage of the present invention is to provide an apparatus, a system and a method for securing, for attaching and/or for detaching a device to a fixture which may provide a key to detach the device from the fixture.

And, another advantage of the present invention is to provide an apparatus, a system and a method for securing, for attaching and/or for detaching a device to a fixture which may align the head unit with respect to the post.

Yet another advantage of the present invention is to provide an apparatus, a system and a method for securing, for attaching and/or for detaching a device to a fixture with an adhesive for connecting the device to the head unit.

A further advantage of the present invention is to provide an apparatus, a system and a method for securing, for attaching and/or for detaching a device to a fixture with reduced friction and/or increased longevity of a cable.

A still further advantage of the present invention is to provide an apparatus, a system and a method for securing, for attaching and/or for detaching a device to a fixture which may provide electrical security to the device.

Moreover, another advantage of the present invention is to provide an apparatus, a system and a method for securing, for attaching and/or for detaching a device to a fixture which allows detachment of the device from the fixture and electrical security to the device.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to an apparatus, a system and a method for securing, for attaching and/or for detaching a device to a fixture. The apparatus, the system and the method may attach, may connect and/or may secure the device to a fixture via a base, a post, a crown, a head unit and/or a cable. The head unit may have an adhesive for connecting, for attaching and/or for securing the device to the head unit. The post may have a retractable reel to attach, to connect and/or to secure the device to the cable, to the post, to the base and/or to the fixture, respectively. The retractable reel may allow the cable to be pulled, to be moved and/or to be extendable with respect to the fixture and/or the post. The cable may extend with respect to the retractable reel, the post and/or the exterior surface of the fixture. The cable may have an anchor for connecting, for attaching and/or for securing the head unit to the cable. Furthermore, the head unit may have a spring for attaching and/or detaching the head unit from the cable. The device may attach and/or detach from the fixture, the base and the post such that a customer and/or a user may manipulate and/or examine the device.

Figures 1, 3:
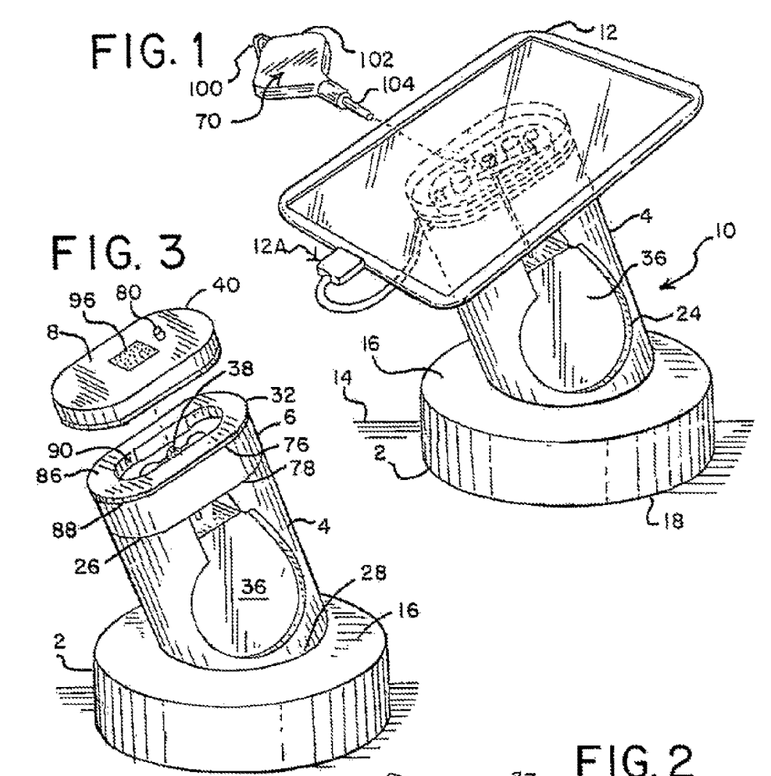
FIG. 1 is a perspective view of a device mounted to a system in an embodiment of the present invention.
FIG. 3 is a perspective view of the device showing the head unit detached from the cable and the post.
Figure 2:
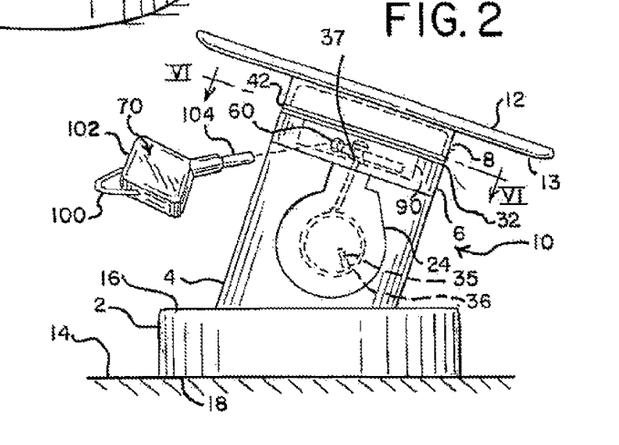
FIG. 2 is a side view of the device attached to a system in an embodiment of the present invention.

Referring now to the drawings wherein like numerals refer to like parts, FIGS. 1 and 2 illustrate an apparatus 10 which may secure a device 12 to a fixture 14 in an embodiment of the present invention. The apparatus 10 may have a base 2, a post 4, a crown 6, a head unit 8, a cap 32, a retractable reel 36 and a key 70. The retractable reel 36 may have a cable 34 which may be pulled, moved and/or extended with respect to the retractable reel 36. The device 12 may be a portable electronic device, such as, for example, a camera, a camcorder, a digital camera, a digital music player, a video game, a digital video player, a digital video recorder, a PDA, a laptop or tablet computer, an E-book, an E-reader, a cellular telephone and/or the like. Further, the device 12 may have an underside 13 for securing the device 12 to the head unit 8.

As illustrated in FIGS. 1 and 2, the base 2, the post 4, the crown 6, the head unit 8, the cap 32 and/or the retractable reel 36 may be constructed from a material, such as, for example, a plastic, a thermoplastic, a silicone, a rubber, a metal and/or the like and/or any combination thereof. It should be understood that the base 2, the post 4, the crown 6, the head unit 8, the cap 32 and/or the retractable reel 36 may be constructed from any material as known to one having ordinary skill in the art. The cable 34 may be made from a material, such as, for example, steel and/or the like.

The base 2 may have a top end 16 and/or a bottom end 18. The bottom end 18 may be located at a position opposite to the top end 16. The base 2 may attach to and/or may mount to a fixture 14. The fixture 14 may be a wall, a floor, a pillar, a support beam, a stair case or a fixture, such as, for example, a cabinet, a table, a shelf and/or the like. The present invention should not be deemed as limited to the embodiments of a specific structural element and/or a specific fixture 14. The bottom end 18 of the base 2 may be fastened to the fixture 14 by screws, adhesive, cable and/or the like. It should be understood that the base 2 may be fastened by any type of fastener and/or any number of fasteners as known to one of ordinary skill in the art.

The post 4 may attach to the base 2. The post 4 may have a top wall 26 and/or a bottom wall 28 wherein the bottom wall 28 is located at a position opposite to the top wall 26. The bottom wall 28 of the post 4 may attach to the top end 16 of the base 2. The post 4 may fasten to the base 2 by screws, retaining clips, adhesive and/or the like. It should be understood that the post 4 may fasten to the base 2 by any type of fastener and/or any number of fasteners as known to one of ordinary skill in the art.

As shown in FIGS. 1 and 2, the retractable reel 36 may be located within a compartment 24 of the post 4. The retractable reel 36 may allow the cable 34 to extend and/or retract with respect to the base 2, the post 4, the crown 6 and the fixture 14. The retractable reel 36 and the cable 34 may allow the device 12 to be manipulated and/or to be examined away from the fixture by a customer and/or a user. The retractable reel 36 may attach to, fasten to, and/or connect to the post 4. As a result, the cable 34 may attach to, fasten to, and/or connect to the fixture 14. The retractable reel 36 may be a spring and pulley, a spring tether, an elastic cable and/or the like. The present invention should not be deemed as limited to the embodiments of a specific structural element and/or a specific cable retractor 36.

Figures 4, 5, 6:
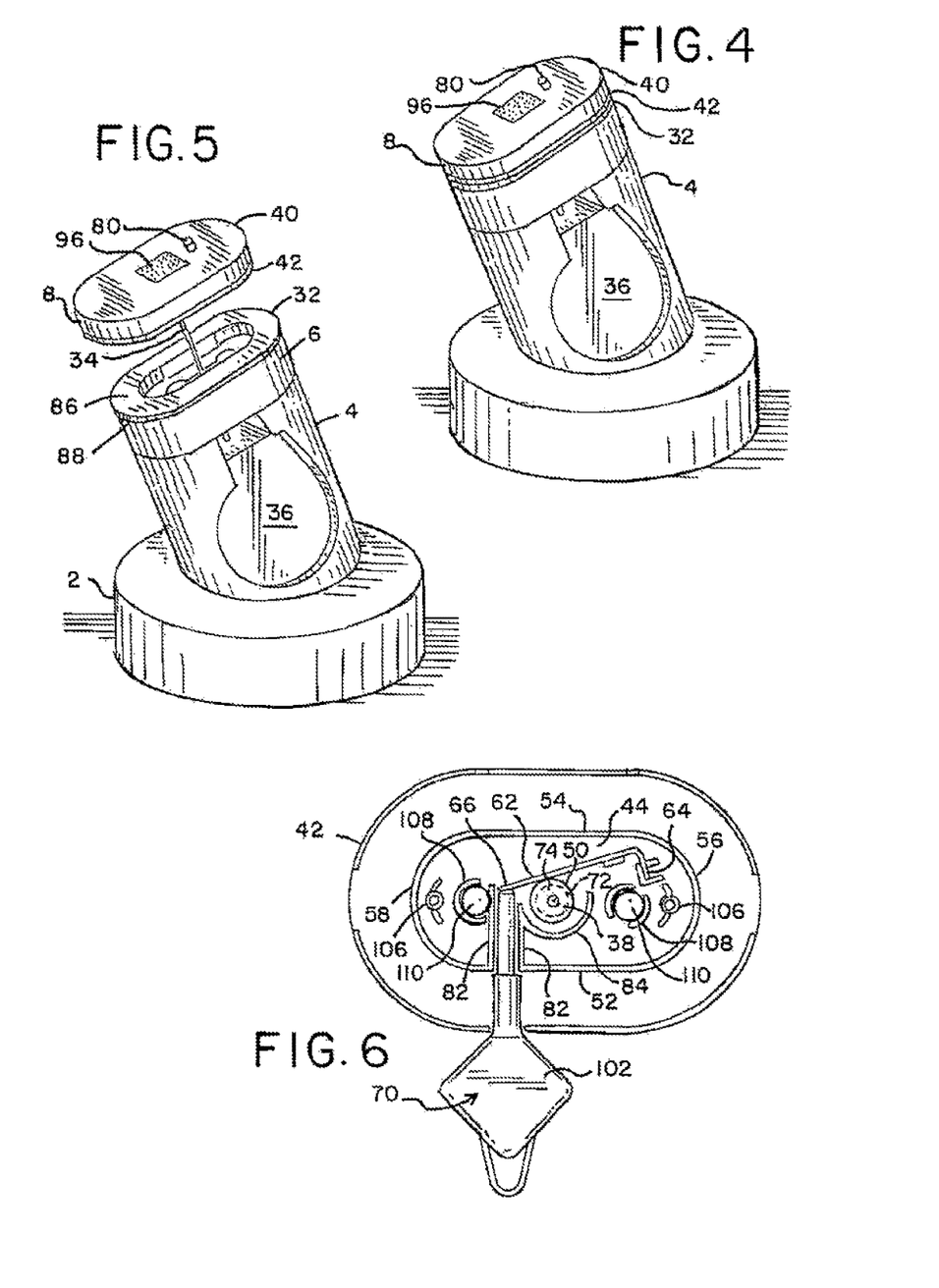
FIG. 4 is a perspective view of the device showing the head unit inserted into the post.
FIG. 5 is a perspective view of the device showing the head unit extending from the post.
FIG. 6 is a cross-sectional view of the head unit taken generally along line VI-VI of FIG. 2 in an embodiment of the present invention.

As illustrated in FIGS. 2 and 5, the cable 34 may extend through the post 4 and the crown 6 and may exit through the cap 32. The cable 34 may have a length defined by a first end 35 and a second end 37. The first end 35 of the cable 34 may be located at a position opposite to the second end 37. The first end 35 may attach to the base 2, the post 4, the crown 6 and the fixture 14 through the retractable reel 36. The second end 37 may attach to an anchor 38.

Figure 7:
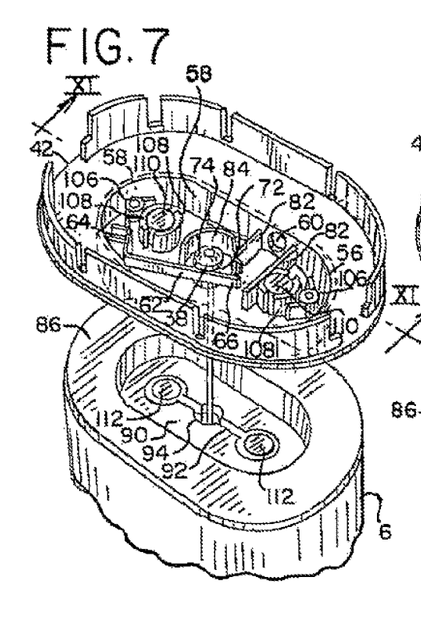
FIG. 7 is a perspective view of the interior cavity of the head unit showing the anchor attached to the spring.
Figure 8:
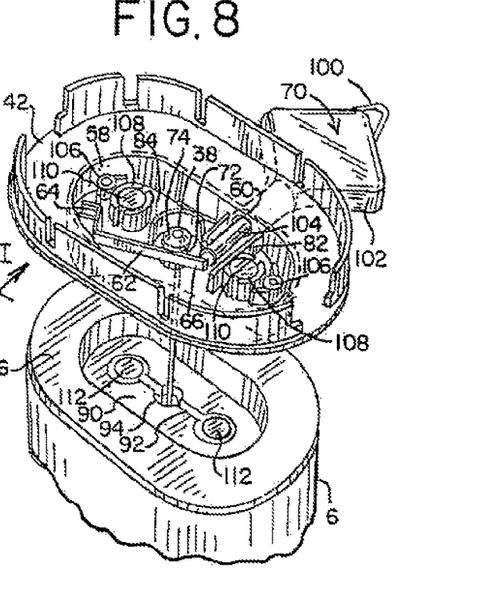
FIG. 8 is a perspective view of the interior cavity of the head unit showing the key releasing the spring from the anchor.
Figures 9, 10, 11:
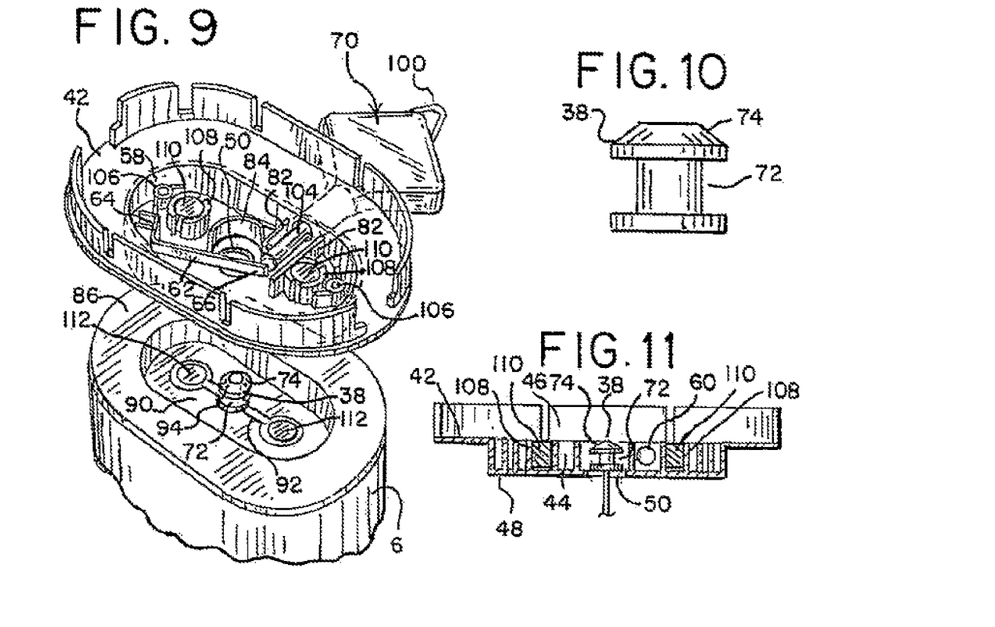
FIG. 9 is a perspective view of the interior cavity of the head unit showing the anchor detached from the spring.
FIG. 10 is a side view of the anchor.
FIG. 11 is a cross-sectional view of the interior cavity of the head unit taken generally along line XI-XI of FIG. 7 in an embodiment of the present invention.

As illustrated in FIGS. 2, 7 and 8, the anchor 38 may be press-fit or bonded to the second end 37 to fasten the second end 37 to the cable 34. The anchor 38 may be made from a material, such as, for example, steel and/or the like. As illustrated in FIG. 10, the anchor 38 may have a groove 74 that may be located circumferentially around the anchor 38 and in a direction perpendicular to the cable 34. Also, the anchor 38 may have a tapered tip 74. The tapered tip 74 may extend in a direction away from and/or parallel to the cable 34. The anchor 38 may be made from a material, such as, for example, steel and/or the like.

FIGS. 1-5 generally illustrate the crown 6 that may be attached to the post 4. The crown 6 may have an upper end 76 and/or a lower end 78. The lower end 78 may be positioned at a location opposite to the upper end 76. The lower end 78 of the crown 6 may be fastened to the top wall 26 of the post 4. The crown 6 may be fastened to the post 4 by screws, retaining clips, adhesive and/or the like. The crown 6 may be hollow to allow the cable 34 to travel through the crown 6.

As illustrated in FIG. 3, the cap 32 may attach to the upper end 76 of the crown 6. The cap 32 may have an upper side 86 and/or a lower side 88. The lower side 88 may be positioned at a location opposite to the upper wall 86. The lower side 88 of the cap 32 may be fastened to the upper end 76 of the crown 6. The cap 32 may fasten to the crown 6 by, for example, screws, retaining clips, adhesive and/or the like.

As illustrated in FIGS. 1-3, 5 and 7-9, the cap 32 may have a recession 90 which may extend inward with respect to the upper side 86 of the cap 32. The recession 90 may be sized to receive the head unit 8 for displaying the device 12. A slit 92 and/or a hole 94 may be formed in the cap 32 and may extend through the cap 32. The hole 94 may be centered with respect to the cap 32 and the recession 90. The slit 92 and/or the hole 94 may be sized to allow the cable 34 to travel through the slit 92 and/or the hole 94. The slit 92 and/or the hole 94 may be sized to prevent friction between the cable 34 and/or the cap 32 and may allow the cable 34 to travel that may increase the longevity of the cable 34. Further, the hole 94 may be sized to prevent the anchor 38 from retracting through the cap 32 and into the retractable reel 36.

As illustrated in FIGS. 3-5, the head unit 8 may have a top cover 40 and/or a bottom cover 42. The bottom cover 42 may be located at a position opposite to the top cover 40. The top cover 40 may attach to the device 12. The top cover 40 of the head unit 8 may have, for example, an adhesive 96 that may attach the top cover 40 to the device 12. The present invention should not be deemed as limited to a specific embodiment of the material of the adhesive 96. It should be understood that the adhesive 96 may be any adhesive as known to one having ordinary skill in the art.

The head unit 8 may have a plunger 80. The plunger 80 may be connected to a printed circuit board (not shown and hereinafter "PCB") to detect the attachment of the head unit 8 to the device 12. The plunger 80 may extend through the top cover 40 and may contact the underside 13 of the device 12. The plunger 80 may be depressed by the device 12 when the head unit 8 is attached to the device 12. The PCB may monitor the attachment of the head unit 8 to the device with the plunger 80. The PCB may be housed within the head unit 8. In addition, the PCB may be wirelessly connected to and/or in communication with an alarm box (not shown) to provide electrical security to the device 12. As a result, an unauthorized separation of the device 12 from the head unit 8 may cause the PCB to activate the alarm box and trigger an audible alarm. Further, an unauthorized separation of the head unit 8 or the device 12 from the power cable 12A may also trigger an audible alarm. The power cable 12A may also be used to provide power to the device 12 and/or to charge the device 12.

As illustrated in FIG. 11, the bottom cover 42 may have a top side 46 and/or a bottom side 48. The bottom side 48 may be positioned at a location opposite to the top side 46. The bottom side 48 of the bottom cover 42 may be sized and/or shaped to insert into the recession 90 of the cap 32. The shape of the recession 90 may substantially match the shape of the bottom side 48 of the bottom cover 42. The bottom side 48 may have, for example, a circular shape, an oval shape and/or the like. It should be understood that the shape of the bottom side 48 of the bottom cover 42 may be any shape as known to one of ordinary skill in the art.

As illustrated in FIGS. 6, 9 and 11, the bottom cover 42 may have an interior cavity 44 defined by the bottom side 28, a first flat sidewall 52, a second flat sidewall 54, a first round sidewall 56 and a second round sidewall 58. The first flat sidewall 52 is positioned at a location opposite to the second flat sidewall 54. The first round sidewall 56 is positioned at a location opposite to the second round sidewall 58. The bottom cover 42 may have an opening 50 which may extend through the bottom side 28 and into the interior cavity 44. The opening 50 may be centered with respect to the head unit 8 and the bottom cover 42. The opening 50 may also have a guide 84 surrounding a portion of the opening 50.

As illustrated in FIGS. 6-9 and 11, the interior cavity 44 may have head unit magnets 110 secured by retainers 108 to the bottom side 48 of the bottom cover 42. The crown 6 may have crown magnets 112 positioned at the upper end 76. The head unit magnets 110 may engage the crown magnets 112 to retain the head unit 8 within the recession 90.

The interior cavity 44 may also have bosses 106 attached to the bottom side 48 of the bottom cover 42. Fasteners (not shown) may engaged the bosses 106 to attach the PCB over the interior cavity 44 of the bottom cover 42. In addition, the guide 84, the bosses 106, the retainers 108 and the head unit magnets 110 may have a similar height to allow the PCB to be positioned a distance above the bottom side 48 and also supported by the guide 84, the bosses 106, the retainers 108 and the head unit magnets 110.

The bottom cover 42 may have a spring 62 located within the interior cavity 44. The spring 62 may have a first end 64 and/or a second end 66. The second end 66 is positioned at a location opposite to the first end 64. The first end 64 of the spring 62 may attach to the bottom side 28 and/or the second flat sidewall 54 of the bottom cover 42. The second end 66 of the spring 62 may extend in a direction toward the opening 50 and the first flat sidewall 52. The second end 66 may extend to a point beyond the opening 50 to allow a portion of the spring 62 to overlap a portion of the opening 50.

The spring 62 may attach the cable 34 to the head unit 8. When connecting the cable 34 to the head unit 8, the anchor 38 may be inserted into the opening 50. The anchor 38 may be positioned within the opening 50 to allow the spring 62 to rest within the groove 72 of the anchor 38. The overlapping relationship of the spring 62 with the opening 50 may allow the spring 62 to attach to the anchor 38. The tapered tip 74 of the anchor 38 may gradually deflect the spring 62 away from the first flat sidewall 52 as the anchor 38 travels through the opening 50. The deflection of the spring 62 may increase until the groove 72 is located at a position beside the spring 62. The decreased diameter of the groove 72 may cause a decrease in the deflection of the spring 62, and the spring may come to rest within the groove 72. The spring 62 may remain within the groove 72 to allow the head unit 8 to attach to the cable 34. The guide 84 may also support the anchor 38 to ensure the spring 62 remains engaged within the groove 72.

As illustrated in FIGS. 1, 2 and 6-9, the bottom cover 42 may have a keyhole 60 that may be sized to receive the key 70. The keyhole 60 may extend through the first flat sidewall 52 and in a direction toward the spring 62. It should be understood to one having ordinary skill in the art that the position of the keyhole 60 is not limited to a position located within the first flat sidewall 52. The keyhole 60 may be located within any wall of the interior cavity 44. Further, the keyhole 60 is not limited to providing access to only the second end 66 of the spring 62. The keyhole 60 may be positioned to provide access to any portion of the spring 62 by the key 70.

The keyhole 60 may have vertical guide walls 82 extending from the keyhole 60 and toward the spring 62. The vertical guide walls 82 may be attached to the first flat sidewall 52, the bottom side 48 of the bottom cover 42 and/or the guide 84. The vertical guide walls 82 may provide access to the spring 62.

The key 70 may have a key ring 100, a handle 102 and a barrel pin 104. The key ring 100 may allow the key 70 to be carried by a retail store employee. The key ring 100 and the handle 102 may be made from a material, such as, for example, a plastic, a thermoplastic, a silicone, a rubber, a metal and/or the like and/or any combination thereof. The barrel pin 104 may be a male 3.5 millimeter Tip-Ring-Sleeve ("TRS") connector as generally known to one having ordinary skill in the art. The barrel pin 104 may be a mono or stereo TRS connector. Further, the barrel pin 104 may be made from a material, such as, for example, steel, silver, gold and/or the like. It should be understood that the size, the shape and/or the diameter of the key ring 100, the handle 102 and/or the barrel pin 104 may be any size, shape and/or diameter as known to one of ordinary skill in the art.

The key 70 may be used to detach the cable 34 from the head unit 8. The key 70 may be inserted into the keyhole 60 and/or may be guided by the vertical guide walls 82 to ensure the key 70 may contact the second end 66 of the spring 62. As a result, the key 70 may deflect the spring 62 in a direction away from the opening 50. The key 70 may deflect the spring until the spring 62 is no longer located in a position overlapping the opening 50 and/or in contact with the anchor 38 and/or the groove 72.

After the cable 34 has been detached from the head unit 8, the customer and/or the user may manipulate and/or examine the device 12 without the tension of the cable 34 and/or the retractable reel 36 that may pull the device 12 towards the fixture 14. Although the mechanical security has been removed, electronic security may still be provided to the device 12 by the PCB and/or the alarm box to prevent tampering and/or theft of the device 12.

The retractable reel 36 may retract cable 34 into the post 4 after the cable 34 has been detached from the head unit 8. The anchor 38 may come to rest above the slit 92 and/or the hole 94 to center the anchor 38 with respect to the recession 90, as shown in FIG. 9.

The customer and/or the user may re-attach the head unit 8 and/or the device 12 when finished manipulating and/or examining the device 12. The head unit 8 and/or the device 12 may be re-attached to the cable 34 and anchor 38 by inserting the bottom side 48 of the head unit 8 into the recession 90 of the cap 32. The anchor 38 centered with respect to the recession 90 may be aligned with the opening 50 within the bottom side 48 of the head unit 8. Therefore, the anchor 38 may enter the opening 50 when inserting the bottom side 48 of the head unit 8 into the recession 90. As a result, the spring 62 may engage the anchor 38 to reattach the head unit 8 to the cable 34.

The customer and/or the user may also inspect, manipulate and/or examine the device 12 with the cable 34 attached. The retractable reel 36 may allow the cable 34 to be pulled, moved and/or extended with respect to the fixture 14 to allow the device to move a distance from the fixture 14. After the customer and/or the user has finished inspecting, manipulating and/or examining the device 12, the retractable reel 36 may retract the cable 34 to pull the head unit 8 and/or the device 12 towards the post 4. The retractable reel 36 may continue pulling the head unit 8 and/or the device 12 until the bottom side 48 of the head unit 8 is inserted into the recession 90 of the cap 32. As a result, the device 12 may be inspected, manipulated and/or examined by the next customer and/or user.

In an alternative embodiment, the key 70 may be used to silence an audible siren. The key 70 and barrel tip 104 may be inserted into the alarm box to silence the audible siren. In addition, the key 70 may have an embedded microchip (not shown) in communication with the barrel tip 104. When inserted into the alarm box, the barrel tip 104 may allow the exchange of information between the microchip and the alarm box. The microchip may store and communicate alarm information and configuration settings.

In yet another embodiment, the post 4 may attach directly to the fixture 14. The bottom wall 28 of the post 4 may fasten to the fixture 14 by screws, adhesive, cable and/or the like. It should be understood that the post 4 may be fastened by any type of fastener and/or any number of fasteners as known to one of ordinary skill in the art.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A system for removably securing a device to a fixture, the system comprising:
   a post configured to mount to the fixture above the fixture;
   a crown configured to attach to the post, the crown including a recession;
   a retractable reel configured to be located within the post;
   a head unit configured to attach to the device, wherein a portion of the head unit is configured to be received within the recession of the crown, wherein the head unit comprises a spring;
   a cable having a first end and a second end, the first end configured to attach to the retractable reel and the second end configured to attach to the head unit; and
   a key configured to release the spring to detach the second end of the cable from the head unit.

2. The system of claim 1, further comprising:
   a connector,
   wherein the second end of the cable is configured to attach to the head unit with the connector, and wherein the key is configured to release the connector from the head unit.

3. The system of claim 1, further comprising:
   a base configured to mount the post to the fixture, wherein the base is configured to be positioned between the retractable reel and the fixture.

4. The system of claim 1, wherein the reel is configured to attach within a compartment of the post.

5. The system of claim 1, wherein the fixture comprises a cabinet, a table or a shelf.

6. The system of claim 1, wherein the crown is configured to mount to the post with screws.

7. The system of claim 1, wherein the crown is configured to mount to a top of the post.

8. The system of claim 1, wherein the recession of the crown is configured to align the head unit with the crown.

9. The system of claim 1, wherein the cable is configured to extend and retract with respect to the retractable reel.

10. The system of claim 1, wherein the head unit is configured to attach to the device with an adhesive.

11. A apparatus for removably attaching a device to a fixture, the apparatus comprising:
    a base configured to attach to a top surface of a fixture;
    a post attached to the base on a side opposite the top surface of the fixture;
    a reel configured to attach within the post;
    a cable configured to connect to the reel at a first end of the cable, wherein a second end of the cable is configured to extend away from the reel; and
    a head unit configured to attach to a device, wherein the second end of the cable is configured to removably attach to the head unit, wherein the head unit comprises a spring, release of which detaches the second end of the cable from the head unit.

12. The apparatus of claim 11 further comprising:
    a crown configured to attach to the post, wherein the crown is configured to mate with a bottom of the head unit.

13. The apparatus of claim 12, wherein the crown comprises a recession, and the recession is configured to receive a bottom portion of the head unit.

14. The apparatus of claim 13, wherein a shape of the recession is configured to reciprocally match a shape of the bottom portion of the head unit to align the head unit with respect to the post.

15. The apparatus of claim 11, wherein the second end of the cable is configured to removably attach to the head unit with a connector, and wherein the connector is configured to be inserted into a bottom portion of the head unit.

16. The apparatus of claim 15, further comprising:
a key configured to unlock the connector from the head unit.

17. A system for securing a device to a fixture, the system comprising:
- a base including a first side and a second side that is opposite the first side, the second side configured to attach to a top surface of the fixture;
- a post including a first end and a second end that is opposite the first end, the second end attached to the first side of the base;
- a retractable reel configured to be located within the post;
- a cable configured to attach to the retractable reel, wherein the cable is configured to extend and retract from within the post;
- a connector at an end of the cable
- a head unit configured to attach to the connector, wherein the head unit comprises a spring;
- a crown configured to attach to the first end of the post, the crown comprising a recession sized to receive a portion of the head unit; and
- a key configured to release the spring to unlock the connector from the head unit.

18. The system of claim 17, wherein the crown is configured to attach to the post at an angle with respect to the base.

19. The system of claim 17, wherein the post is configured to attach at an angle with respect to the fixture.

20. The system of claim 17, wherein the connector and a length of cable is configured to extend from and retract within the post.

21. A system for securing a device to a top fixture surface of a fixture, the apparatus comprising:
- a post including a top surface and a bottom surface, wherein the bottom surface is configured to mount on the top fixture surface of the fixture;
- a crown removably attached to the top surface of the post, the crown including a recession that extends inward towards the post;
- a retractable reel including a cable, wherein the retractable reel is configured to be disposed within the post;
- a head unit configured to removably attach to an end of the cable, the head unit comprising a bottom cover including a size and shape corresponding to the recession, wherein the recession aligns the head unit with respect to the post, wherein the head unit comprises a spring; and
- a key configured to release the spring to detach the end of the cable from the head unit.

22. The system of claim 21, wherein the device is a portable electronic device and the fixture is selected from one of: a cabinet, a table, or a shelf.

23. The system of claim 21, further comprising:
a base attached to the bottom surface of the post, the base configured to mount to the top fixture surface between the post and the top fixture surface.

24. The system of claim 21, wherein the crown is fastened to the post by screws and the crown is hollow to allow the cable to travel through the crown.

25. The system of claim 21, further comprising:
an opening centered within the recession to allow the cable to extend from the post.

26. The system of claim 21, wherein the size and shape of the bottom cover is correspondingly matched to a size and shape of the recession to insert into the recession and align the head unit with respect to the post.

27. The system of claim 21, wherein the end of the cable includes a connector, the connector is configured to connect the cable to the head unit, the spring is configured to secure the connector to the head unit, the bottom cover of the head unit includes a keyhole adjacent the spring, and the key is configured to insert into the key hole and deflect the spring away from the connector to remove the connector from the head unit.

* * * * *